United States Patent [19]

Fahlen

[11] Patent Number: 4,971,823

[45] Date of Patent: Nov. 20, 1990

[54] HIGH FIBER NATURAL BREAD

[76] Inventor: Arne E. Fahlen, 7181 Camino Del Rey Dr., NE., Rockford, Mich. 49341

[21] Appl. No.: 375,536

[22] Filed: Jun. 30, 1989

Related U.S. Application Data

[63] Continuation of Ser. No. 44,814, Apr. 30, 1987, abandoned.

[51] Int. Cl.$^5$ .......................... A21D 2/00; A21D 13/00
[52] U.S. Cl. ........................................ 426/549; 426/21; 426/804
[58] Field of Search ..................... 426/549, 804, 19, 21

[56] References Cited

U.S. PATENT DOCUMENTS 4,225,628  9/1980  Lynn .................................... 426/549
4,305,971  12/1981  Stone .................................... 426/549

OTHER PUBLICATIONS

De Gouy, The Bread Tray, published by Greenberg Publisher, Oct. 1944 (p. 146).
Taylor, Fruit Pastes/Concentrates Key Ingredients in 'Sugarless' Cookies, Food Engineering, Sep. 1984 (p. 52).
Webb et al., Byproducts from Milk, Second Edition, published by the AVI Webb et al., Byproducts from Milk, Second Edition, published by the AVI Publishing Company, Inc., 1970 (p. 408).
Jacobs, The Chemical Analysis of Foods and Food Products, published by D. Van Nostrand Co., Inc., 3rd Ed., 1958 (pp. 336–339).
Tressler et al., Food Products Formulary, vol. 2, published by the AVI Publishing Co., Inc., 1975 (pp. 51, 237 and 238).

Primary Examiner—George Yeung
Attorney, Agent, or Firm—Price, Heneveld, Cooper, DeWitt & Litton

[57] ABSTRACT

The specification discloses a high fiber baked product including flour, of which the majority comprises a high fiber flour, intimately mixed with from about 5 to about 15% by weight, based on dry flour weight, of a high fiber fruit paste.

37 Claims, No Drawings

HIGH FIBER NATURAL BREAD

This application is a continuation of application Ser. No. 07/044,814 filed Apr. 30, 1987, now abandoned.

BACKGROUND OF THE INVENTION

The present invention relates to high fiber content baked goods. To be called "high fiber," bread must include 2 grams of fiber per slice.

Typically, the fiber content of baked goods, as for example high fiber bread, is increased by adding wood fiber, ground stems or the like. While such ingredients are in the broadest sense "natural ingredients," they are not the type of ingredients one would expect or desire to find in bread or other baked products.

Fat is also added to bread to facilitate processing. This is of course undesirable from a health standpoint.

While the problem of increasing fiber content of baked product and the problem of added fat are not in and of themselves related, they are both solved through the synergistic results achieved by the present invention.

SUMMARY OF THE INVENTION

The present invention comprises a high fiber baked product comprising flour and from about 5 to about 15% by weight, based on the dry flour weight, of a high fiber fruit paste intimately mixed with the flour. While fruit paste has been used in flavor fillings for baked products in the past, the use of the paste of a high fiber fruit intimately mixed with the flour in producing a high fiber baked product is believed to be unique and the results achieved are surprising. The presence of the high fiber fruit paste not only improves fiber content in the product, but also enhances processability, such that the addition of fat for processing purposes can be avoided if the formulator so desires.

These and other objects, advantages and features of the invention will be more fully understood and appreciated by reference to the preferred embodiment and claims set forth hereinafter.

DESCRIPTION OF THE PREFERRED EMBODIMENT

In the preferred embodiment, the baked product of the present invention is made by blending a base mix containing high protein flour, a fruit paste based primarily on high fiber fruit, and bulk ingredients including a high fiber flour. Preferably, the fruit paste includes citrus fruit pulp as well as high fiber fruit paste. The citrus fruit pulp serves as a natural preservative for the product.

All percentages set forth herein are by weight, and are based on the total dry flour weight incorporated into the final baked product. This is standard practice in the baking art since it is important that all ingredients be present in proper proportion to the quatity of flour.

The Fruit Paste

The fruit paste comprises primarily the paste of high fiber fruit. Examples of high fiber fruits include figs, raisins and dates. Any one or a mixture of the pastes of these high fiber fruits can be utilized.

Fig paste provides not only high fiber content, but also exceptional nutritional value. One hundred grams of dried figs contain 250 calories, 3 grams of protein, 59 grams of complex carbohydrates and 2.1 grams of natural vegetable fat, and the following percentages of the U.S. recommended daily allowance of the indicated ingredients: protein 4%, Thiamine 2%, Riboflavin 4%, Niacin 2%, Calcium 15%, Iron 10%, Phosphorus 6%, Magnesium 15%, Copper 10%, Zinc 2%.

Raisin paste provides not only high fiber content, but also serves as a natural mold inhibitor. Raisins are also highly nutritional and have a high complex carbohydrate content. Similarly, date paste is high in complex carbohydrate content as well as in fiber content.

The total high fiber fruit paste content of the product is 5 to 15% by weight, based on the dry weight of flour. This can be made up of any one or a combination of the foregoing high fiber fruit pastes.

The fruit paste also preferably includes citrus pulp in an amount sufficient to comprise from 0.5 to 2% by weight of the final product based on the dry flour weight. The citrus pulp serves as a natural inhibitor and gives the bread better flavor acceptance.

Preferably, both orange pulp and lemon pulp are included. The orange pulp comprises 0.25 to 1% by weight based on the dry weight of flour and the lemon pulp comprises from 0.25 to 1% based on the dry weight of flour. As much as 0.5% orange pulp has been used in prior art baked products for improving flavor. Lemon pulp, containing more acid, tends to be more of a mold inhibitor.

Finally, some water may be added to the fruit paste mix in order to give it a consistency equivalent to that of the dough into which it has to be mixed. Usually, from about 1 to about 5% water, based on the dry flour weight, is added to the fruit paste for this purpose.

Base Mix

The base mix in the preferred embodiment includes vital wheat gluten and wheat bran flakes in addition to conventional ingredients found in such mixes. Vital wheat gluten provides additional protein to help carry the weight of the high fiber flour and fruit present in the preferred embodiment product. Without the strength of protein, the fiber content tends to puncture the yeast bubbles. The vital wheat gluten can be said to give the bread better crumb structure. The quantity of vital wheat gluten should be from about 7 to about 10% by weight based on the dry flour weight of the total blend. If too much is used, the resulting bread or baked product is too tough.

Wheat bran flakes are added to increase the quantity of dietary fiber present naturally. From about 4 to 5% by weight wheat bran flakes are employed.

The remaining ingredients of the base mix are conventional. From 0 to 18% of a high protein wheat flour is included. This serves as a carrier for the fiber and makes the dough mix more machinable in production. It gives plasticity to the dough. Too much high protein wheat flour has to be avoided as it requires the use of less high fiber flour. The high protein wheat flour and the vital wheat gluten are the two flour components of the base mix.

From 3 to 6% nonfat milk solids are included to increase the protein and calcium content of the product. This also helps to give the product a brown color when toasted.

From about 1.5 to about 2% salt is included to control the yeast and give flavor to the product. From about 0.3 to 0.5% sodium stearoyl 2 lactylate dough conditioner is included. From about 30 to about 60 parts per million ascorbic acid is included as a natural dough conditioner.

Bulk Ingredients

The above described base mix and paste mix are incorporated into the bulk ingredients necessary to produce a baked product such as bread. In a high fiber bread, these bulk ingredients include flaked wheat flour which comprises from about 75 to about 90% by weight of the dry flour content. Flaked wheat flour consists of the whole crushed wheat berry. It contains the wheat germ and is very high in fiber and protein content. It passes through rollers and is unrefined.

The amount of water used will vary with the amount and types of flour employed. However, the water content will be from about 60 to about 75% by weight based on dry flour weight.

Naturally, yeast is also added during the final mixing. The quantity of the yeast must be sufficient to cause the bread to rise. Typically, from about 2.5 to about 5% by weight yeast is appropriate.

EXAMPLE

The following is a specific example of a commercial bread mix made in accordance with the present invention. This example illustrates the best mode currently contemplated.

|  | Pounds and Ounces | % By Weight Relative to Dry Flour Weight |
| --- | --- | --- |
| Base Mix | | |
| vital wheat gluten | *21-0 | 7.45342 |
| wheat bran flakes | 12-0 | 4.25909 |
| high protein wheat flour | *48-12 | 17.30257 |
| nonfat milk solids | 10-8 | 3.72671 |
| salt | 5-4 | 1.86335 |
| sodium stearoyl lactylate | 0-14 | 0.31056 |
| ascorbic acid | 60 ppm | 60 ppm |
|  | 98 lbs. 6 oz. | |
| Fruit Paste | | |
| fig paste | 9-4 | 3.28305 |
| raisin paste | 9-4 | 3.28305 |
| date paste | 9-4 | 3.28305 |
| orange pulp | 1-8 | 0.53239 |
| lemon pulp | 1-8 | 0.53239 |
| water | 9-4 | 3.28305 |
|  | 40 lbs. 0 oz. | |
| Bulk Ingredients | | |
| flaked wheat flour | *212-0 | 75.24401 |
| water | 200-0 | 70.98492 |
| yeast | 10-0 | 3.54925 |
|  | 422 lbs. 0 oz. | |
| Total Dry Flour* | 281.75 | |

Of course, it is understood that the above is a preferred embodiment of the invention and that various changes and alterations can be made without departing from the spirit and broader aspects thereof as set forth in the appended claims.

The embodiments of the invention in which an exclusive property or privilege is claimed are defined as follows:

1. A high fiber baked product comprising:
yeast; flour, the major portion of which comprises high fiber flour, and about 7 to 10% of which comprises vital wheat gluten; and
from about 5 to 15% by weight, based on the dry flour weight, of the paste of a high fiber fruit intimately mixed therewith, said baked product being substantially free of added fat.

2. The baked product of claim 1 which additionally includes from about 0.5 to about 2% by weight, based on dry flour weight, of a citrus fruit pulp.

3. The baked product of claim 2 in which said citrus fruit pulp includes a mixture of orange pulp and lemon pulp.

4. The baked product of claim 2 in which said high fiber fruit paste includes fig paste.

5. The baked product of claim 4 in which said high fiber fruit paste includes date paste.

6. The baked product of claim 5 in which said high fiber fruit paste includes raisin paste.

7. A baked product baked from ingredients comprising:
yeast; flour, in which said flour comprises from about 75 to about 90% by weight flaked wheat flour, up to about 18% by weight high protein wheat flour, and about 7 to 10% vital wheat gluten; and
from about 5 to 15% by weight, based on the dry flour weight, of at least one fruit paste selected from the group consisting of date paste, fig paste, raisin paste and mixtures thereof intimately mixed with said flour and yeast said baked product being substantially free of added fat.

8. The baked product of claim 7 which additionally includes from about 4 to about 5% by weight, based on dry flour weight, wheat bran flakes.

9. The baked product of claim 8 which additionally includes from about 0.5 to about 2% by weight, based on dry flour weight, of a citrus fruit pulp.

10. The baked product of claim 9 which is free of artificial preservatives.

11. The baked product of claim 1 in which said high fiber fruit paste consists of one of date paste, fig paste, raisin paste and mixtures thereof.

12. A high fiber baked product baked from ingredients comprising:
yeast; flour, of which from about 75 to about 90% by weight comprises flaked wheat flour, and about 7 to 10% of which comprises vital wheat gluten;
from about 5 to about 15% by weight, based on dry flour weight, of the paste of fruit; and
from about 0.5 to about 2% by weight citrus pulp, all intimately mixed said baked product being substantially free of added fat.

13. The baked product of claim 12 which is free of artificial preservatives.

14. The baked product of claim 12 in which said fruit paste is selected from the group consisting of date paste, fig paste, raisin paste and mixtures thereof.

15. The baked product of claim 14 in which said citrus pulp comprises from about 0.25 to about 1% lemon pulp and from about 0.25 to about 1% orange pulp, said percentages being based on dry flour weight.

16. The baked product of claim 15 in which said flour component includes up to about 18% by weight high protein wheat flour.

17. The baked product of claim 16 which additionally includes from about 4 to about 5% by weight based on dry flour weight of wheat bran flakes.

18. The baked product of claim 12 in which said flour component includes up to about 18% by weight high protein wheat flour.

19. The baked product of claim 18 which additionally includes from about 4 to about 5% by weight based on dry flour weight of wheat bran flakes.

20. A method for producing a baked product comprising:

intimately mixing yeast, flour, the major portion of which comprises high fiber flour and about 7 to 10% of which comprises vital wheat gluten, and from about 5 to 15% by weight, based on the dry flour weight, of the paste of fruit, in the substantial absence of added fat, and baking said intimately mixed ingredients.

21. The method of claim 20 in which from about 0.5 to about 2% by weight, based on dry flour weight, of a citrus fruit pulp is intimately mixed in with the other ingredients.

22. The method of claim 21 in which said citrus fruit pulp includes a mixture of orange pulp and lemon pulp.

23. A method for producing a baked product comprising:

intimately mixing yeast, flour, the major portion of which comprises high fiber flour and about 7 to 10% of which comprises vital wheat gluten, and from about 5 to 15% by weight, based on the dry flour weight, of at least one fruit paste selected from the group consisting of date paste, fig paste, raisin paste and mixtures thereof, in the substantial absence of added fat, and baking said intimately mixed ingredients.

24. The method of claim 23 in which said flour comprises from about 75 to about 90% by weight flaked wheat flour.

25. The method of claim 24 wherein 4 to about 5% by weight, based on dry flour weight, of wheat bran flakes are intimately mixed in with said ingredients prior to baking.

26. The method of claim 24 in which said flour includes up to about 18% by weight high protein wheat flour.

27. The method of claim 23 in which from about 0.5 to about 2% by weight, based on dry flour weight, of a citrus fruit pulp is intimately mixed in with the other ingredients.

28. The method of claim 27 in which said ingredients are characterized by the substantial absence of artificial preservatives.

29. A method for producing a baked product comprising:

intimately mixing yeast, flour, of which from about 75 to about 90% by weight comprises flaked wheat flour, from about 5 to about 15% by weight, based on dry flour weight, of the paste of fruit, and from about 0.5 to about 2% by weight citrus pulp, in the substantial absence of added fat, followed by baking said ingredients.

30. The method of claim 29 in which said ingredients are characterized by the substantial absence of artificial preservatives.

31. The method of claim 29 in which said ingredients are characterized by the substantial absence of artificial preservatives.

32. The method of claim 29 in which said fruit paste is selected from the group consisting of date paste, fig paste, raisin paste and mixtures thereof.

33. The method of claim 32 in which from about 0.5 to about 2% by weight, based on dry flour weight, of a citrus fruit pulp is intimately mixed in with the other ingredients.

34. The method of claim 33 in which said flour component includes from about 7 to about 10% by weight vital wheat gluten and from about 0 to about 18% by weight high protein wheat flour.

35. The method of claim 34 wherein 4 to about 5% by weight, based on dry flour weight, of wheat bran flakes are intimately mixed in with said ingredients prior to baking.

36. The method of claim 29 in which said flour component includes from about 7 to about 10% by weight vital wheat gluten and from about 0 to about 18% by weight high protein wheat flour.

37. The method of claim 36 wherein 4 to about 5% by weight, based on dry flour weight, of wheat bran flakes are intimately mixed in with said ingredients prior to baking.

* * * * *